(12) United States Patent
Mochizuki et al.

(10) Patent No.: US 6,652,130 B2
(45) Date of Patent: Nov. 25, 2003

(54) VEHICLE HEADLAMP

(75) Inventors: Katsuhito Mochizuki, Shizuoka (JP); Takashi Matsunaga, Shizuoka (JP); Shigeyuki Watanabe, Shizuoka (JP); Kiyotaka Fukawa, Shizuoka (JP); Takashi Hori, Shizuoka (JP); Masatoshi Yoneyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/052,394

(22) Filed: Jan. 23, 2002

(65) Prior Publication Data

US 2002/0097585 A1 Jul. 25, 2002

(30) Foreign Application Priority Data

Jan. 25, 2001 (JP) .................................. P2001-017489
Jan. 25, 2001 (JP) .................................. P2001-017490

(51) Int. Cl.⁷ ................................................ F21V 7/00
(52) U.S. Cl. ........................ 362/517; 362/277; 362/285; 362/523; 362/531
(58) Field of Search ................... 362/517, 487, 362/507, 518, 523, 524, 525, 528, 529, 531, 538, 539, 269, 277, 285, 385, 386, 418, 433, 464, 465, 466, 37

(56) References Cited

U.S. PATENT DOCUMENTS

| | | | |
|---|---|---|---|
| 4,831,506 A | | 5/1989 | Miyazawa |
| 5,436,807 A | | 7/1995 | Kobayashi |
| 5,526,247 A | * | 6/1996 | Sugiyama .................. 362/517 |
| 6,120,169 A | | 9/2000 | Sato |

FOREIGN PATENT DOCUMENTS

| | | |
|---|---|---|
| DE | 196 49 602 | 6/1997 |
| DE | 198 02 023 | 8/1998 |
| GB | 2 337 810 | 12/1999 |

* cited by examiner

*Primary Examiner*—Sandra O'Shea
*Assistant Examiner*—John Anthony Ward
(74) *Attorney, Agent, or Firm*—Sughrue Mion, PLLC

(57) ABSTRACT

A vehicle headlamp includes a lamp body having a hollow portion opening forward, a support member supported tiltably in the lamp body, and a plurality of reflectors supported side by side in one of the vertical and lateral directions by the support member. Each reflector is made to support a corresponding light source and least one of the reflectors is pivotably supported by the support member in the horizontal direction. In one embodiment, a lower reflector is pivotable in the horizontal direction and a low beam is formed by an upper reflector and the light source supported by the upper reflector. In this embodiment, the upper reflector does not have any portion that does not affect luminous distribution.

17 Claims, 8 Drawing Sheets

VEHICLE HEADLAMP

BACKGROUND OF THE INVENTION

1. Field of the Invention

The present invention relates to a vehicle headlamp operable to emit one beam when using a plurality of reflectors supporting their respective light sources. More particularly, the present invention relates to a vehicle headlamp using the plurality of reflectors which has reduced vertical dimensions and can be aimed with ease.

2. Description of the Related Art

In a vehicle headlamp, two reflectors supporting their respective light sources are often used to emit one beam.

For example, an automotive headlamp needs to be adapted to turn part of the beam to the right or left with respect to the main optical axis when the steering wheel is turned to follow a curved road in order to irradiate the route ahead. Consequently, an attempt has been made to effect this arrangement such that one of the reflectors is set to irradiate the direction of the main optical axis at all times, whereas the other reflector is pivoted to the right or left when the steering wheel is turned to ensure that the route ahead is irradiated.

The automotive headlamps include an aiming adjustment for adjusting the direction in which a beam is emitted.

In the conventional automotive headlamp designed to emit one beam by using two reflectors as stated above, the two reflectors have been incorporated separately into a lamp body. Consequently, the aiming adjustment has to be made separately with respect to the two reflectors. Having to adjust the aim of the headlamp for each reflector is often troublesome.

As one unified beam emission has to be carried out by the two reflectors in the conventional vehicle headlamp, the relative angular relation between the optical axes of the two reflective surfaces needs to be accurately regulated.

However, it is extremely difficult to achieve the consistency between the beams emitted from the two reflectors in the case where the two reflectors can be subjected to angular adjustment separately with respect to the lamp body. Therefore, much time is usually required to achieve the necessary consistency therebetween.

Further, in the conventional vehicle headlamp, an arrangement of two reflectors side by side in the lateral direction tends to considerably increase the lateral size of the vehicle headlamp since a large space is required to allow the reflector designed to swing the beam. In addition, there still exists a problem arising from the fact that consistency between the beams emitted from the two reflectors is hardly achievable because the optical axes of the two reflectors cross each other in the horizontal direction.

An arrangement of two reflectors side by side in the vertical direction tends to increase the vertical size of the vehicle headlamp and this results in not only deteriorating the external appearance of the vehicle, but also making it difficult to use this type of headlamp in an automobile having a front-end portion that is small in vertical size.

SUMMARY OF THE INVENTION

A first object of the present invention is to provide a vehicle headlamp for use in emitting one beam by means of two reflectors supporting their respective light sources such that an aiming operation is performed with ease.

A second object of the present invention is to provide a vehicle headlamp adapted for use in emitting one beam by employing two reflectors supporting their respective light sources such that the vertical size of the vehicle headlamp can especially be reduced.

In order to achieve these objectives, a vehicle headlamp according to the invention comprises a lamp body including a hollow portion opening forward, a support member tiltably supported in the lamp body, and a plurality of reflectors supported side by side in one of the vertical and lateral directions by the support member, each reflector being made to support a corresponding light source, wherein at least one of the reflectors is pivotably supported by the support member in the horizontal direction.

In the vehicle headlamp according to the invention, as the reflectors are supported by one support member, which is tiltably supported by the lamp body, the reflectors are simultaneously tilted by the same amount in the same direction with respect to the lamp body by tilting the support member, so that an aiming adjustment can simultaneously be made to the reflectors. When the reflectors are supported by the support member in such a manner that the relative angular relation between the optical axes of the reflectors has been set consistent with the relation between the beams emitted from the reflectors, moreover, the aiming adjustment will be carried out by tilting the support member. As such, it is unnecessary to adjust the angular relation between the optical axes of the two reflectors again.

In another embodiment of the invention, a vehicle headlamp comprises two reflectors disposed side by side in the vertical direction and the entire upper reflector of the two reflectors is operable to affect luminous distribution.

In explanation, in the vehicle headlamp according to this embodiment, a portion of the upper reflector that does not affect luminous distribution is removed from the reflector, therefore only the portion of the upper reflector that affects luminous distribution remains. Accordingly, the lower reflector can be disposed in the portion thus removed, whereby the size of the vehicle headlamp in the vertical direction is reducible.

BRIEF DESCRIPTION OF THE DRAWINGS

FIG. 8(a) is a vertical sectional view and FIG. 8(b) is an exploded perspective view.

FIG. 9(a) is a vertical sectional view and FIG. 9(b) is an exploded perspective view.

DETAILED DESCRIPTION OF THE DRAWINGS

A vehicle headlamp embodying the invention will now be described with reference to the accompanied drawings. Incidentally, the embodiment shown with reference to the drawings refers to a case where the invention is applied to an automotive headlamp for emitting a low beam.

Figure 1:
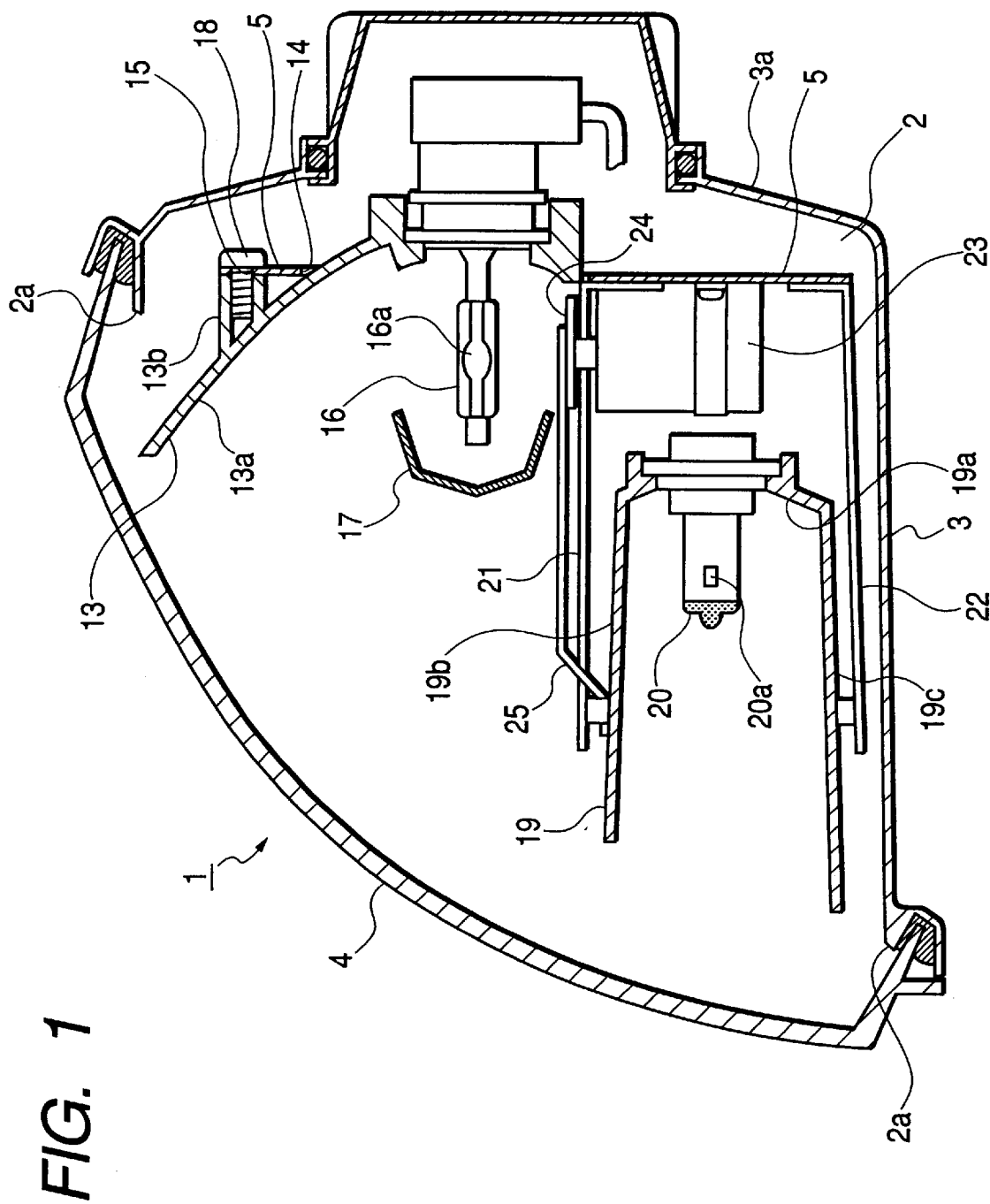
FIG. 1 is a vertical sectional view of a vehicle headlamp as a first embodiment of the invention, together with FIGS. 2 and 3.
Figure 2:
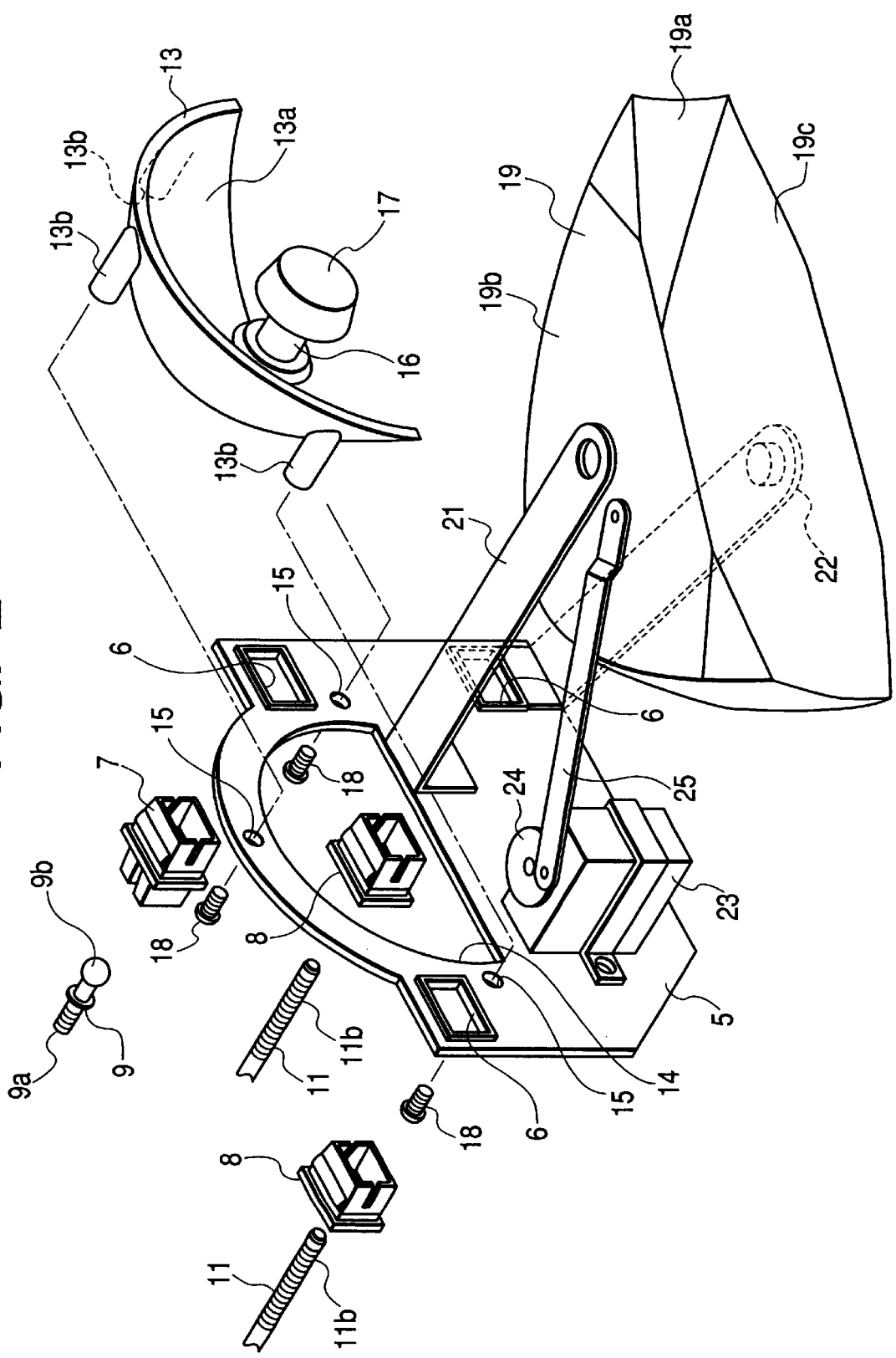
FIG. 2 is an exploded perspective view of the principal part.
Figure 3:
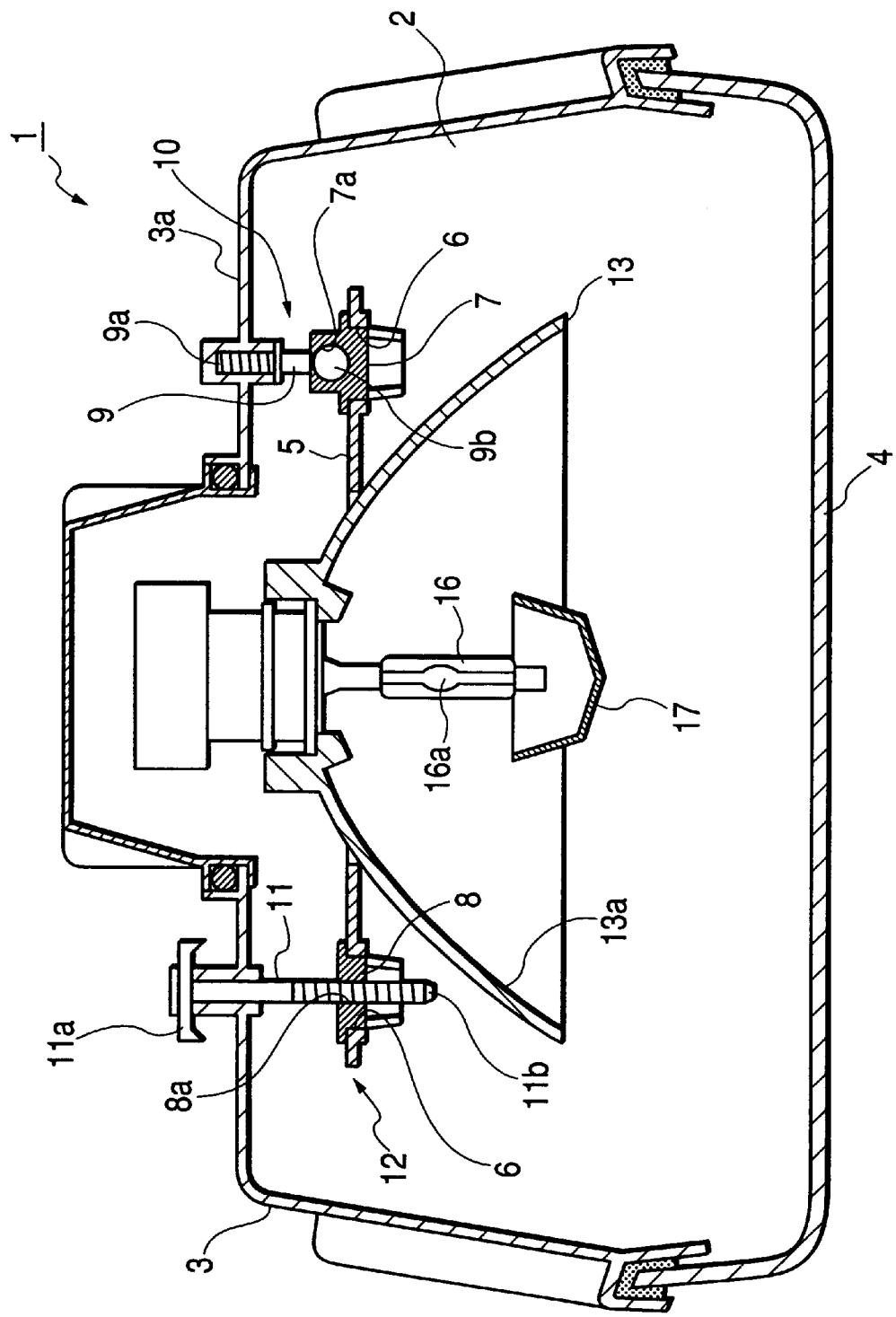
FIG. 3 is a sectional view of a space adjusting portion and a pivoting support portion.

FIGS. 1 to 3 show a vehicle headlamp as a first embodiment of the invention.

A vehicle headlamp 1 has a lamp body 3 having a hollow portion 2 opening forward. The opening face 2a of the lamp body 3 has its front tilted backward. Further, the opening face 2a is covered with a transparent front cover 4 (see FIG. 1).

A bracket 5 as a support member is disposed in the hollow portion 2 of the lamp body 3 whose opening face 2a is covered with the front cover 4. The bracket 5 is substantially in the form of a plate and tiltably supported by the lamp body 3. Mounting holes 6, 6 and 6 are formed in the upper right, lower right and upper left portions of the bracket 5 as seen from the front, and lines connecting these three mounting holes 6, 6 and 6 intersect at right angles (see FIG. 2).

A ball receiver 7 is supported with the upper right hole 6 of the bracket 5. The ball receiver 7 is a resin-made block formed with a spherical cavity portion 7a opening backward (see FIG. 3). Moreover, nut bodies 8 and 8 are supported with the respective upper left and lower right mounting holes 6 and 6 of the bracket 5. Each nut body 8 is a resin-made block formed with a lower hole 8a as a longitudinal through-hole (see FIGS. 2 and 3).

A support shaft 9 is fixed to the rear wall surface 3a of the lamp body 3. The rear end portion of the support shaft 9 is formed as a threaded portion 9a, which is screwed into the rear wall surface 3a of the lamp body 3. Further, a spherical body 9b is formed at the front end of the support shaft 9 and pivotably fitted into a spherical cavity portion 7a of the ball receiver 7 (see FIG. 3). The ball receiver 7 and the support shaft 9 constitute a pivoting support portion 10.

Two aiming screws 11 and 11 are rotatably supported with the rear wall surface 3a of the lamp body 3. Operable portions 11a and 11a are formed in the rear end portions of the aiming screws 11 and 11, the rear end portions thereof being projected backward from the rear wall surface 3a of the lamp body 3. Bolt portions 11b and 11b formed in the first half portions of the aiming screws are screwed into the lower holes 8a and 8a of the nut bodies 8 and 8, respectively (see FIG. 3). Each nut body B and each aiming screw 11 constitute a space adjusting portion 12.

The bolt portions 11b and 11b are screwed into the respective nut bodies 8 and 8 by rotating the aiming screws 11 and 11 or unscrewed therefrom depending on the rotational direction in the space adjusting portions 12 and 12.

Consequently, the space between the portion used to support the nut bodies 8 and 8 of the bracket 5 and the portion used to support the aiming screws 11 and 11 is made adjustable thereby. Therefore, when the aiming screw 11 is rotated in the lower right space adjusting portion 12, the bracket 5 is tilted in the vertical direction with a line connecting the pivoting support portion 10 and the upper left space adjusting portion 12 as a pivotal axis. Moreover, when the aiming screw 11 is rotated in the upper left space adjusting portion 12 (as shown in FIG. 3), the bracket 5 is tilted laterally with a line connecting the pivoting support portion 10 and the lower right space adjusting portion 12 as a pivotal axis.

A main reflector 13 for forming a low beam is supported with the substantially upper half portion of the bracket 5. The main reflector 13 has a reflective surface 13a in a substantially parabolic shape with the greater part of the portion positioned under the optical axis of the reflective surface 13a removed. That is, the main reflector 13 is semicircular having an arc upward as seen from the front (see FIG. 2). There are also three mounting bosses 13b, 13b, 13b (only two of them are shown in FIG. 2) projected from the back of the main reflector 13. A substantially semicircular opening 14 is formed in the upper half portion of the bracket 5 and three screw inserting holes 15, 15 and 15 are formed around the opening 14 (see FIG. 2).

The configuration of the reflective surface 13a of the main reflector 13 is not limited to a parabolic shape, but may be of any other type. For example, a step reflector so configured as to have finely partitioned reflective elements as a whole, or a free curved surface and so forth may be employed.

Figure 5:
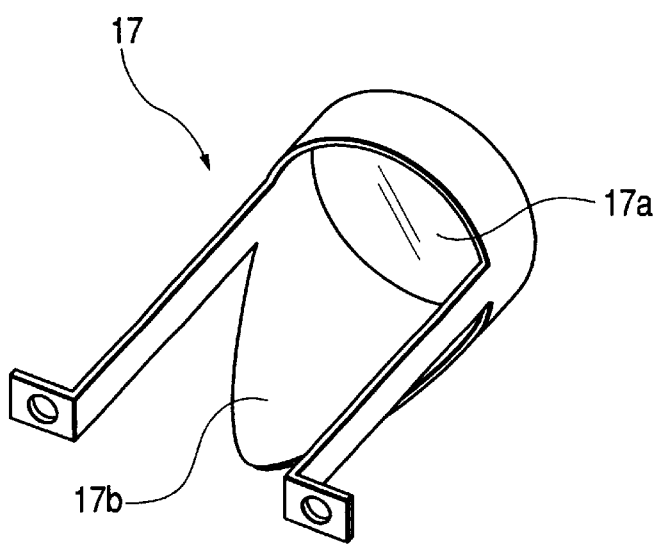
FIG. 5 is an enlarged perspective view of a shade.

A light source bulb 16 is detachably supported by the main reflector 13. According to this embodiment of the invention, a discharge bulb is employed as the light source bulb 16 (see FIG. 1). Of course, the light source supported by the main reflector 13 in any embodiment of the present invention need not be a discharge bulb, but may be any type of bulb that provides a predetermined luminous intensity. The light emitting portion (discharge area) 16a of the light source bulb 16 is positioned close to the focal point of the reflective surface 13a so that the greater part of the light emitted from the light source bulb 16 and reflected from the reflective surface 13a is emitted downward with respect to the optical axis of the reflective surface 13a. In this case, a shade 17 for shading the light emitted forward and downward from the light source bulb 16 is arranged for the purpose of forming the cut-line of the low beam (see FIG. 1). Consequently, the light directly emitted from the light source bulb 16 is not emitted forward and downward. The shade 17 has a forward shade portion 17a for shading the light directly emitted forward from the light source bulb 16 and a downward shade portion 17b for shading the light emitted downward therefrom (see FIG. 5).

Figure 4:
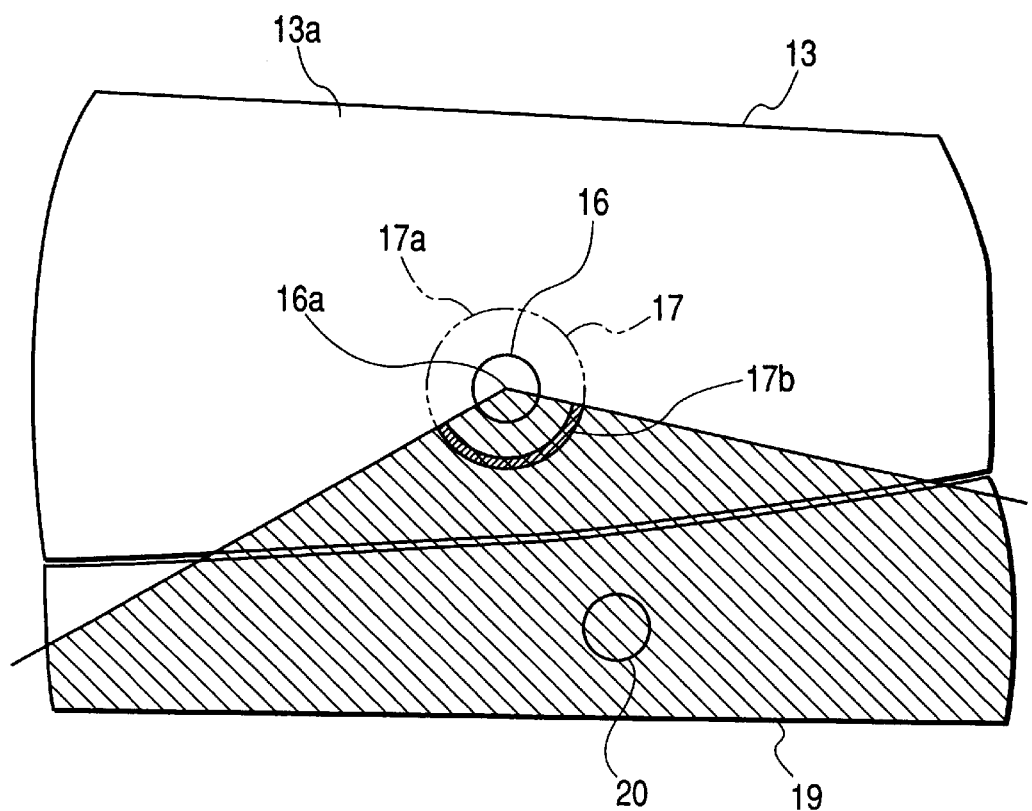
FIG. 4 is a schematic elevational view illustrating a portion which does not affect luminous distribution out of a main reflector (an upper reflector).

Of the main reflector 13, most of the portion lower than the position where the light source bulb 16 is mounted is a portion which does not affect luminous distribution. In other words, since the light directed to the reflective surface positioned downward from the light source bulb is shaded by the downward shade portion 17b (see FIG. 5) when the low beam is emitted so as to prevent glare from being given to an oncoming vehicle, the light emitted from the light source bulb 16 is not directed to an area with slant lines as shown in FIG. 4. Of the main reflector 13, the portion lower than the position where the light source bulb is mounted is unnecessary and a subreflector may be disposed in that portion as will be described later.

Mounting screws 18, 18 and 18 (see FIG. 2) inserted through the screw inserting holes 15, 15 and 15 of the bracket 5 from behind are screwed into the respective mounting bosses 13b, 13b and 13b of the main reflector 13, whereby the main reflector 13 is fixed to the bracket 5. The rear end portion of the main reflector 13 is passed through the opening 14 and projected from the rear side of the bracket 5 (see FIG. 1).

The subreflector 19 is pivotally supported with the substantially lower half portion of the bracket 5. The subreflector 19 comprises a reflective surface portion 19a having a configuration formed by horizontally cutting out the substantially central portion of a parabolic shape, a surface and an undersurface portion 19b and 19c, and a light source bulb 20 being supported with the rear central portion of the reflective surface portion 19a (see FIG. 2). In this embodiment of the invention, though a halogen bulb is used as the light source bulb 20 (see FIG. 1), this does not mean that the light source bulb supported by the subreflector 19 is limited to such a halogen bulb, but may be any type of bulb as long as predetermined luminous intensity is available therefrom. The light emitting portion (filament) 20a of the light source bulb 20 is positioned close to the focal point of the reflective surface portion 19a and the light emitted from the light source bulb 20 and reflected from the reflective surface portion 19a is emitted as luminous flux substantially parallel to the optical axis of the reflective surface portion 19a.

Rear ends of two of upper and lower support arms 21 and 22 are respectively fixed to the substantially central portion and lower end portion of the bracket 5 in the vertical direction. The front end portion of the upper support arm 21 is pivotably coupled to the substantially central portion of the surface portion 19b of the subreflector 19, whereas the front end portion of the lower support arm 22 is also pivotably coupled to the substantially central portion of the undersurface portion 19c of the subreflector 19. Thus, the subreflector 19 is supported with the substantially lower half portion of the bracket 5 in a manner pivotable in the lateral direction.

Accordingly, the subreflector 19 is disposed forward with respect to the main reflector 13, That is, the main reflector 13 is disposed backward with respect to the subreflector 19.

A drive portion 23 is fixed to the lower half portion of the bracket 5. The drive portion 23 is provided with a rotary disc 24 and the rear end portion of a drive link 25 is pivotally coupled to a position close to the periphery edge of the rotary disc 24. The front end portion of the drive link 25 is pivotally coupled to a position offset from the portion supported by the support arm 21 of the surface portion 19b of the subreflector 19 (see FIG. 2). The drive portion 23 is driven in response to the steering operation, or more practically, the operation of turning the steering wheel to follow a curved road. The rotary disc 24 is rotated whenever the drive portion is driven and as the drive link 25 is moved in a substantially longitudinal direction, the subreflector 19 is pivoted laterally. Consequently, the beams derived from the light source bulb 20 and the subreflector 19 are turned to the right or left with respect to the main optical axis coinciding with the optical axis of the main reflector 13. As such, this helps to enhance traffic safety by irradiating the direction of travel beforehand to ensure forward irradiation during traveling on a curved road and when traveling in a curve at an intersection.

Since the main reflector 13 for emitting a beam centering on the main optical axis at all times and the subreflector 19 for emitting a subbeam having a certain angle with the main optical axis in response to the steering operation are supported by the bracket 5 as one support member so as to make the axes of irradiation by means of the main reflector 13 and the subreflector 19 by tilting the bracket 5, an aiming adjustment with respect to the two reflectors 13 and 19 can be carried out simultaneously with the effect of facilitating the aiming operation. Moreover, while the two reflectors 13 and 19 are supported by the bracket 5 in such a state that the angular relation between the optical axes of the two reflectors 13 and 19 is consistent with the beams emitted by the respective reflectors, it is unnecessary to adjust the angular relation between the optical axes of the two reflectors 13 and 19 again as the aiming adjustment is made by tilting the bracket 5.

As the main reflector 13 disposed on the upper side is disposed backward with respect to the subreflector 19 disposed on the lower side in the vehicle headlamp 1, the invention is suitably applicable to a headlamp having the front tilted backward and as the drive portion 23 for tilting the lower reflector 19 can be disposed to the rear of the lower reflector 19, space is effectively utilized.

Further, of the upper reflector 13 having the reflective surface in a parabolic shape, as the greater part of the portion that is positioned under the optical axis of the reflective surface and unnecessary for emitting the low beam is removed, the two reflectors 13 and 19 can be disposed in the vertical direction without waste of space, thereby reducing the vertical size of headlamp 1.

There has been shown a case where the invention is applied to an automotive headlamp for emitting a low beam in the embodiment of the invention. However, the invention is not limited to such an application as stated above but may be applied to an automotive headlamp for emitting a high beam and also to a vehicle headlamp fit for emitting two different beams separately.

FIGS. 6 to 9(a) and 9(b) show a vehicle headlamp as a second embodiment of the invention.

A vehicle headlamp 30 has a lamp body 32 having a hollow portion 31 opening forward. The opening face 2a of the lamp body 32 is covered with a transparent front cover 33 (see FIG. 6). Although the front cover 33 is not provided with lens steps, the lens steps may be provided according to the luminous distribution pattern required.

Figure 7:
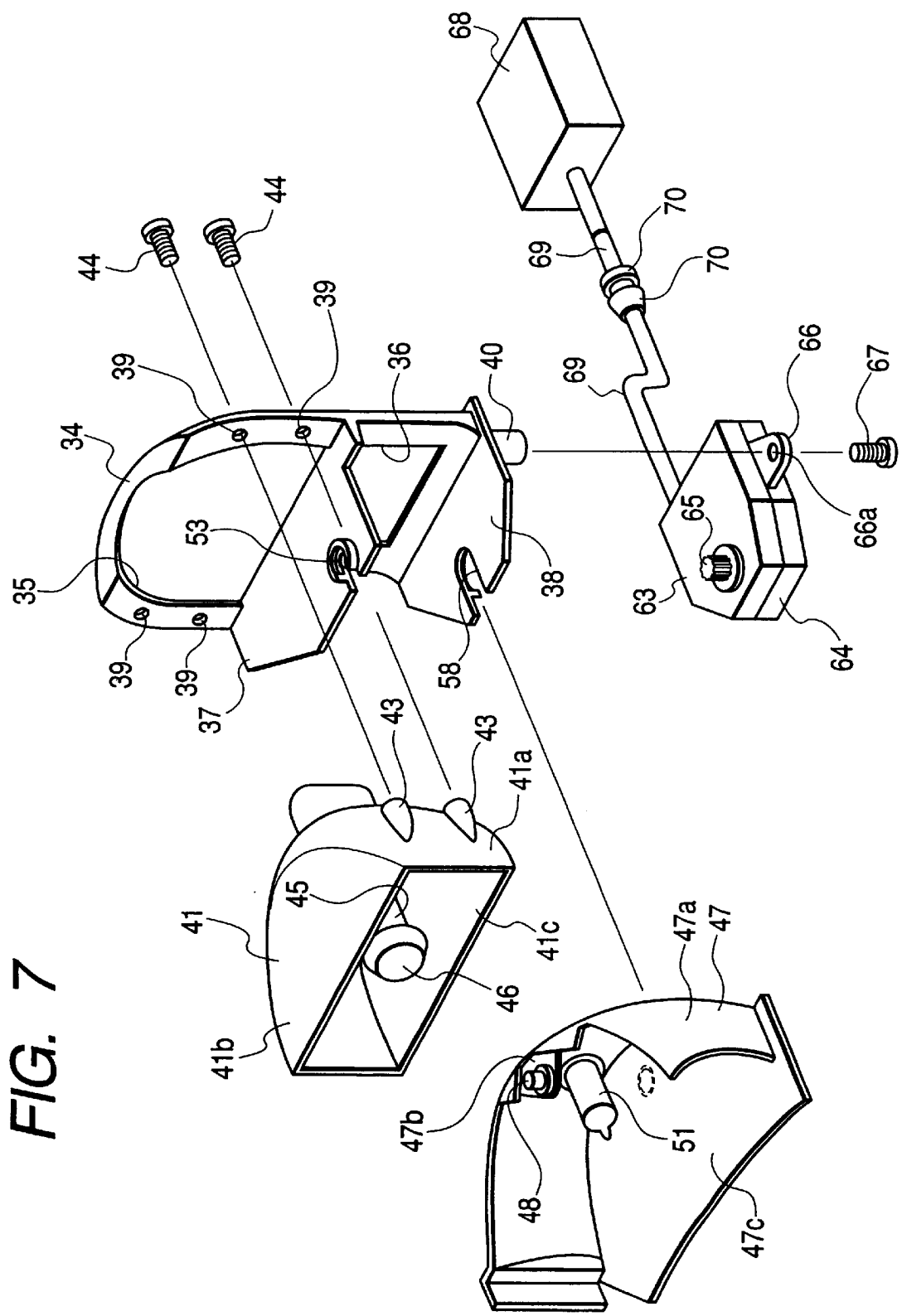
FIG. 7 is an exploded perspective view of the principal part.
Figure 8A:
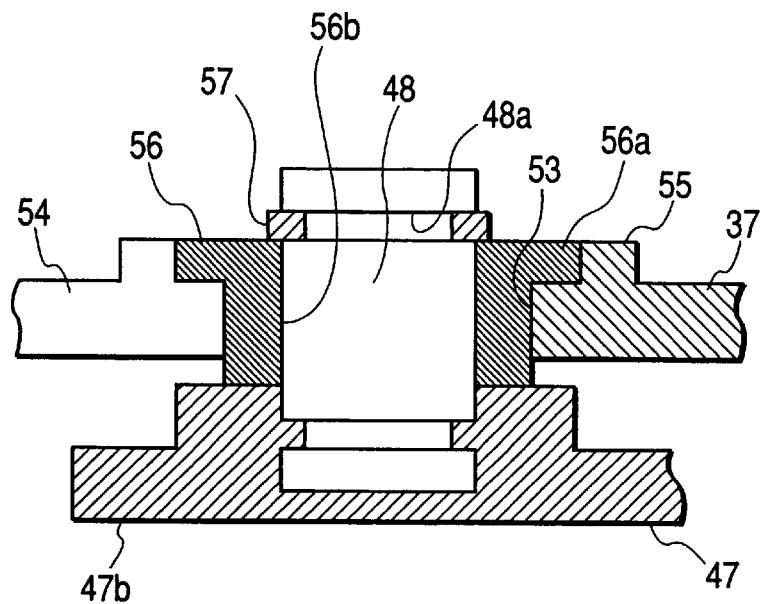
FIGS. 8(a) and 8(b) are diagrams showing the upper pivoting support portion of a subreflector (lower reflector)
Figure 8B:
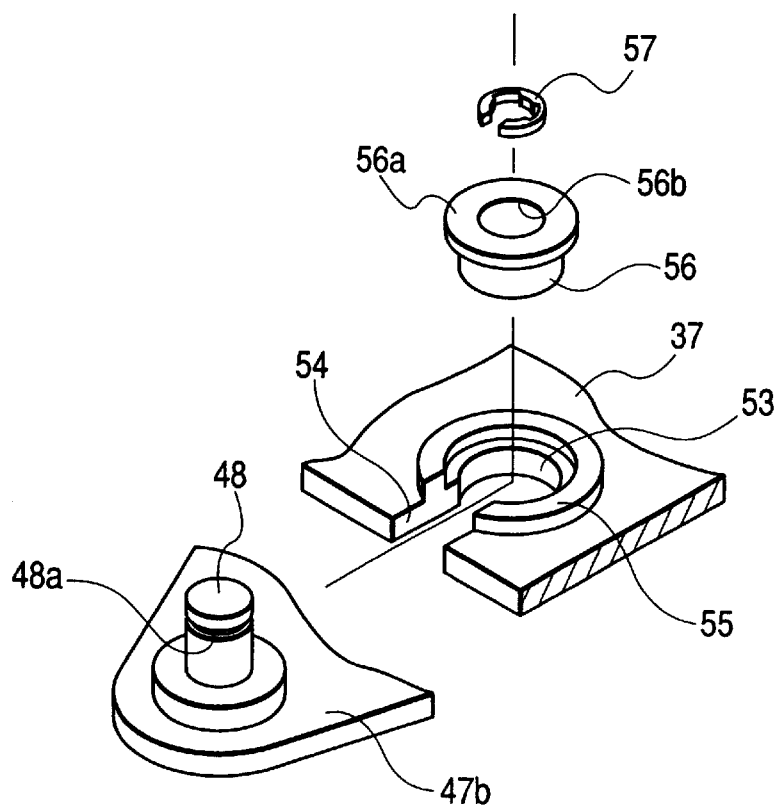
Figure 9A:
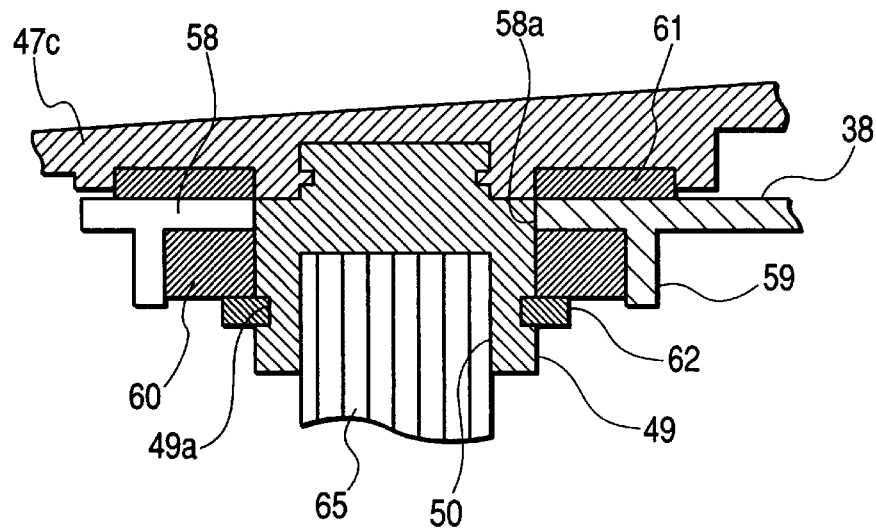
FIGS. 9(a) and 9(b) are diagrams showing the lower pivoting support portion of the subreflector (lower reflector)
Figure 9B:
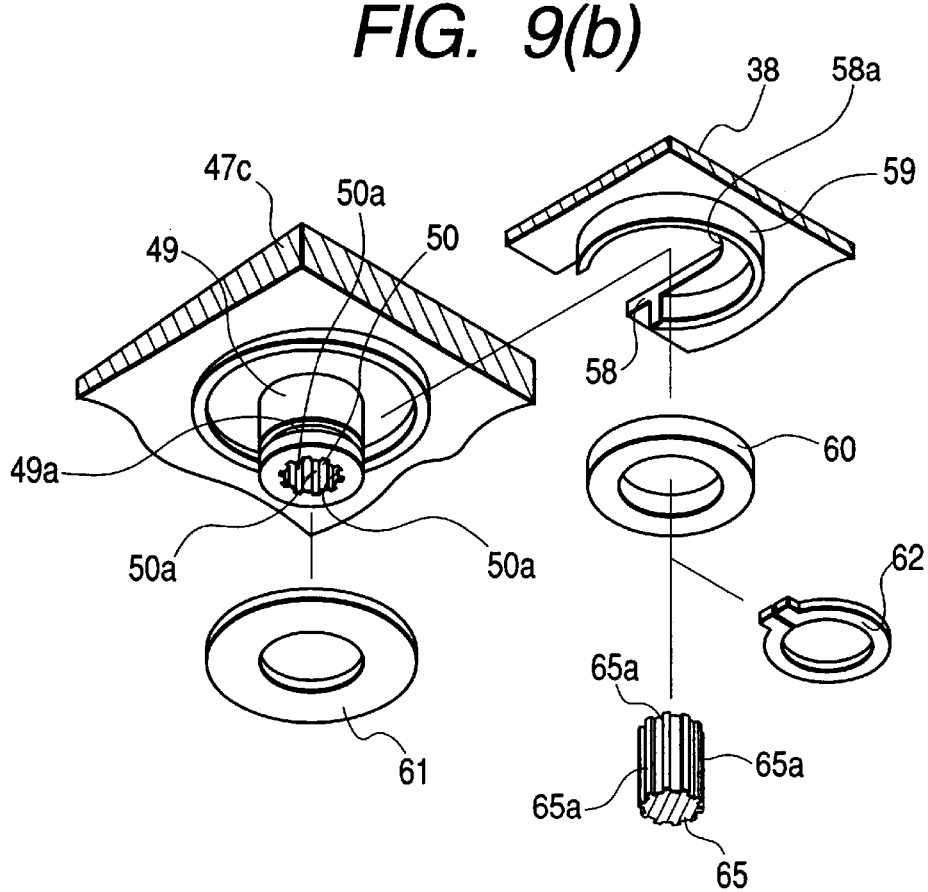

Two reflectors are disposed side by side in the vertical direction via a bracket 34 within the hollow portion 31 of the lamp body 32. The bracket 34 is in the form of a frame having large openings 35 and 36 provided side by side in the vertical direction and opposed vertically-parallel support plates 37 and 38 are projected forward from a position where the lower opening 36 is held therebetween. Screw inserting holes 39 are formed in the portion positioned on both sides of the upper opening 35. Moreover, two mounting bosses 40 and 40 (only one is shown in FIG. 7) laterally separated from each other are projected from the lower end portion of the bracket 34 (see FIG. 7).

A main reflector 41 is fixed to the substantially upper half portion of the bracket 34. The main reflector 41 comprises a reflective surface portion 41a having a reflective surface 42 in the front, a surface portion 41b and a undersurface portion 41c. The front of the reflective surface portion 41a with the reflective surface 42 is so configured that the upper portion from the vicinity of the optical axis of the paraboloid of revolution is cut out to remove a long belt-like section as seen laterally from the front end. Screw bosses 43 (only one side is shown in FIG. 7) are projected in positions close to both the respective lateral ends of the back of the reflective surface portion 41a (see FIGS. 6 and 7).

Mounting screws 44 inserted through the screw inserting holes 39 of the bracket 34 from behind are screwed into the respective screw bosses 43 whereby the main reflector 41 is fixed to the bracket 34. The substantially second half portion of the main reflector 41 is passed through the upper opening 35 of the bracket 34 and projected from the rear side of the bracket 34 (see FIG. 6).

A light source bulb 45 is detachably supported by the main reflector 41. According to this embodiment of the invention, though a discharge bulb is employed as the light source bulb 45 (see FIG. 6), this does not mean that the light source bulb supported by the main reflector 41 is limited to such a discharge bulb, but may be any type of bulb as long as predetermined luminous intensity is available therefrom. The light emitting portion (discharge area) 45a of the light source bulb 45 is positioned close to the focal point of the reflective surface 42 so that the greater part of the light emitted from the light source bulb 45 and reflected from the reflective surface 42 is emitted downward with respect to the optical axis of the reflective surface 42. In this case, a shade 46 is used for shading the light emitted forward and downward (see FIGS. 6 and 7), so that the light directly emitted from the light source bulb 45 is not emitted forward.

Then, luminous distribution as the basis of a low beam is formed by the main reflector 41 and the light source bulb 45.

The reason why the portion under the position where the light source bulb 45 is mounted out of the main reflector 41 is a portion which does not affect luminous distribution is the same as what has been described in the first embodiment of the invention. Consequently, the main reflector 41 does not have any portion under the position where the light source bulb 45 is mounted and a subreflector 47 is disposed in the portion thus removed.

The subreflector 47 is laterally pivotably supported with the substantially lower half portion of the bracket 34.

The subreflector 47 is constituted by a reflective surface portion 47a having a configuration formed by horizontally cutting out the substantially central portion of the parabolic shape, a surface and an undersurface portion 47b and 47c. The surface portion 47b is so configured as to slightly project forward from the central portion in the lateral direction of the upper edge of the reflective surface portion 47a. The undersurface portion 47c is so configured as the project forward from the whole lower edge of the reflective surface portion 47a (see FIG. 7). A support shaft 48 is projected upward from the front end portion of the surface of the surface portion 47b and a mating groove 48a is formed over the whole periphery of the outer peripheral face near the upper end of the support shaft 48 (see FIGS. 6, 7 and 8). A support shaft 49 is projected downward also from a position corresponding to the support shaft 48 formed on the surface portion 47b and a mating groove 49a is formed over the whole periphery of the outer peripheral face near the lower end of the support shaft 49. Moreover, a coupling hole 50 bored in the undersurface of the support shaft 49 and mating grooves 50a axially extended are formed in the inner peripheral face of the coupling hole 50 of the support shaft 49 (see FIGS. 6 and 9).

Figure 6:
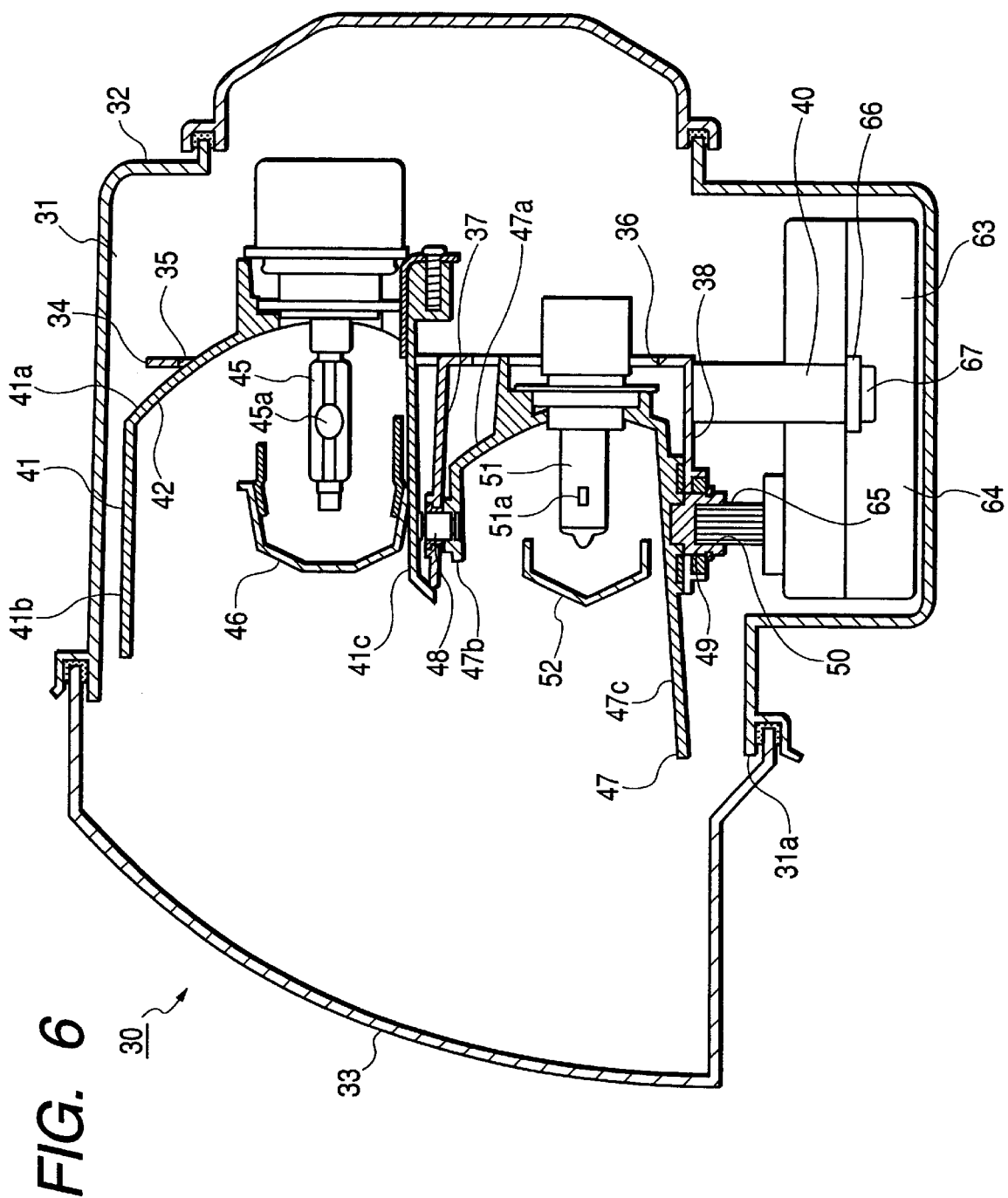
FIG. 6 is a vertical sectional view of a vehicle headlamp as a second embodiment of the invention, together with FIGS. 7 to 9.

A light source bulb 51 is supported with the rear central portion of the reflective surface portion 47a of the subreflector 47 (see FIGS. 6 and 7). In this embodiment of the invention, though a halogen bulb is used as the light source bulb 51 (see FIG. 6), this does not mean that the light source bulb supported by the subreflector 47 is limited to such a halogen bulb, but may be any type of bulb as long as predetermined luminous intensity is available therefrom. The light emitting portion (filament) 51a of the light source bulb 51 is positioned close to the focal point of the reflective surface portion 47a and the light emitted from the light source bulb 51 and reflected from the reflective surface portion 47a is emitted as luminous flux substantially parallel to the optical axis of the reflective surface portion 47a. In this case, a shade 52 for shading the light emitted forward is disposed (see FIG. 6), so that the light directly emitted from the light source bulb 51 is not emitted forward.

The subreflector 47 is laterally pivotably supported between the support plates 37 and 38 of the bracket 34 as follows:

The supporting of the upper support shaft 48 will be described first. A circular support hole 53 is formed in the front end portion of the support plate 37 on the upper side of the bracket 34 and a slit 54 is extended from the support hole 53 up to the front end of the support plate 37. Further, the width of the slit 54 is set slightly greater than the outer diameter of the upper support shaft 48 of the subreflector 47 and a circular low surrounding wall 55 that is a size larger than the support hole 53 and also coaxial with the support hole 53 is uprightly provided in a position slightly away from the open edge of the support hole 53 out of the surface of the support plate 37 (see FIG. 8).

A bearing body 56 is supported with the support hole 53 of the support plate 37. The bearing body 56 is substantially cylindrical and has a circular flange 56a protruding outward in the upper end portion of the bearing body. The inner diameter of the central hole 56b is set slightly greater than the outer diameter of the support shaft 48 on the upper side of the subreflector 47. Moreover, the outer diameter of the flange portion 56a is set slightly smaller than the inner diameter of the surrounding wall 55 of the support plate 37 (see FIGS. 8a and 8b).

While the support shaft 48 of the subreflector 47 is positioned in the center of the support hole 53 of the support plate 37, the bearing body 56 is fitted onto the support shaft 48 from above in this state. As the portion in which the mating groove 48a of the support shaft 48 is formed projects upward from the upper end of the bearing body 56 then, the mating groove 48a is mated with an E-ring 57 (see FIGS. 8a and 8b), whereby the support shaft 48 is integrated with the bearing body 56 and prevented from slipping off the central hole 56b. As the outer diameter of the bearing body 56 is not greater than the width of the slit 54, the bearing body 56 never slips off the support plate 37. Thus, the surface portion 47b of the subreflector 47 is pivotally supported with the portion of the support shaft 48.

The supporting of the lower support shaft 49 of the subreflector 47 will now be described. A cutout 58 opening to the front edge is formed in the support plate 38 on the lower side of the bracket 34 and the rear end edge 58a of the cutout 58 is formed in a semicircular form. The width of the cutout 58 is set slightly greater than the outer diameter of the support shaft 49 on the lower side of subreflector 47 and the rear end edge 58a is set arcuate substantially following the outer peripheral face of the support shaft 49. An arcuate surrounding wall 59 that surrounds the arcuate portion 58a of the slit 58 out of the undersurface of the support plate 48 and is situated in a position slightly apart from the arcuate portion 58a is shaped in the form of "C" as seen from below, the surrounding wall centering on the center of a circle in which the arcuate portion 58a is positioned (see FIG. 9).

A bearing body 60 is so positioned as to be fitted in the surrounding wall 59 of the support plate 38. The bearing body 60 is in a substantially ring form and its outer diameter is set slightly smaller than the inner diameter of the surrounding wall 59, whereas its inner diameter is set slightly larger than the outer diameter of the support shaft 48 on the lower side of the subreflector 47 (see FIG. 9).

A ring-like metal bearing member 61 is fitted onto the base of the support shaft 49 of the subreflector 47 and the support shaft 49 is inserted through the rear end portion of the slit 54 of the support plate 38 and the bearing member 60 in this state. Then a C-ring 62 is mated with the mating groove 49a of the support shaft 49 projected downward from the undersurface of the bearing member 60, whereby the support shaft 49 is prevented from slipping out of the bearing body 60 (see FIG. 9). Thus, the undersurface portion 47c of the subreflector 47 is pivotally supported by the support plate 38 in the portion of the support shaft 49.

In that state, the subreflector 47 is laterally pivotably supported by the support plates 37 and 38 of the bracket 34 and the specific supporting way is as follows:

While the bearing bodies 56 and 60 are not supported by the support plates 37 and 38 of the bracket 34 first, the subreflector 47 is inserted in between the support plates 37 and 38 from the front. Then the support shafts 48 and 49 of the subreflector 47 (in such a condition that the bearing member 61 is fitted onto the base) are inserted into the slits 54 of the respective support plates 37 and the cutout 58 so that the upper support shaft 48 is positioned in the center of the support hole 53 and that the lower support shaft 49 is positioned in the center of the circle in which the arcuate portion 58a of the cutout 58 is positioned. Then the bearing body 56 is fitted onto the upper support shaft 48 through the support hole 53 from above and the flange 56a is fitted into the surrounding wall 55. Further, the bearing body 60 is fitted onto the lower support shaft 49 from below and fitted into the surrounding wall 59 and the E-ring 57 as well as the C-ring are mated with the respective mating grooves 48a and 49a.

Since the subreflector 47 is thus laterally pivotably supported by the support plates 37 and 38, the subreflector 47 can be supported by the support plates 37 and 38 even though the space between the support plates 37 and 38 is substantially the same as the vertical width of the subreflector 47. In this case, the rear end portion of the subreflector 47 is projected backward from the lower opening 36 of the bracket 34 (see FIG. 6).

The drive portion 63 for pivoting the subreflector 47 is supported with the lower end of the bracket 34. The drive portion 63 is formed with a casing 64 containing drive sources such as a motor and a solenoid and other necessary elements, so that a rotating shaft 63 projected upward through the operation of the drive source is rotated. A plurality of engaging teeth 65a extended axially are projected from the outer peripheral face of the rotating shaft 65 (see FIGS. 6 and 9). Further, mounting pieces 66, 66 (only one of them is shown in FIGS. 6 and 7) are projected from both lateral side faces of the casing 64 and screw inserting holes 66a and 66a are formed in the respective mounting pieces 66 and 66.

Mounting screws 64 and 76 (only one of them is shown in FIGS. 6 and 7) inserted through the screw inserting holes 66a and 66a of the respective mounting pieces 66 and 66 from below are screwed into the mounting bosses 40 and 40 of the bracket 34 whereby to mount the drive portion 63 to the lower end portion of the bracket 34. Simultaneously, the rotating shaft 65 of the drive portion 63 is fitted into the coupling hole 50 of the support shaft 49 on the lower side of the subreflector 47 and the engaging teeth 65a of the rotating shaft 64 are mated with the respective mating grooves 50a, 50 of the coupling hole 50, whereby the rotating shaft 65 and the support shaft 49 are coupled together without mutually causing slipping in the direction of revolution.

The drive source (not shown) of the drive portion 63 is driven by a control circuit portion 67. The control circuit portion 67 is designed to send a drive signal corresponding to the steering operation to the drive portion 63 in order to rotate the rotating shaft 65 at a predetermined angle of rotation in a predetermined direction according to the drive signal. Consequently, the subbeam emitted from the light source bulb 51 and the subreflector 47 is directed to the right or left with respect to the main optical axis conforming to the optical axis of the main reflector 41, whereby the direction of travel is irradiated beforehand to ensure forward irradiation during traveling on a curved road and when traveling in a curve at an intersection so as to enhance traffic safety. In this case, the control circuit portion 68 is placed outside the lamp body 32 and codes 69 and 69 and connectors 70 and 70 are used to connect between the control circuit portion 68 and the drive portion 63 (see FIG. 7).

The bracket 34 is fixed to the lamp body 32. In this case, it is possible to make the bracket 34 and the lamp body 32 tiltably supported in order to facilitate the aiming adjustment.

In the vehicle headlamp 30, as the upper reflector 41 is so configured that the greater part of the portion that is positioned under the optical axis and unnecessary for emitting the low beam out of the reflective surface in the parabolic shape is removed and that the subreflector 47 is disposed in the portion thus removed, the two reflectors 41 and 47 can be disposed in the vertical direction without waste of space, therefore reducing the vertical size of headlamp 30.

Moreover, as the rotating shaft 65 of the drive portion 63 for pivoting the subreflector 47 is directly coupled to the lower support shaft 49 of the subreflector 47, it is unnecessary to hold a member such as a drive link 25 according to the first embodiment of the invention (see FIGS. 1 and 2) between the two reflectors 41 and 47, so that the space between the two reflectors 41 and 47 is reducible.

There has been shown a case where the invention is applied to an automotive headlamp for emitting a low beam in the embodiment of the invention. However, the invention is not limited to such an application as stated above but may be applied to an automotive headlamp for emitting a high beam and also to a vehicle headlamp fit for emitting two different beams separately.

Moreover, the configuration and structure of the component parts shown in the above embodiment of the invention are those for use in implementing only a specific embodiment and should not be understood to restrict the technical range of the invention.

As described above, the vehicle headlamp according to a first aspect of the invention comprises the lamp body having the hollow portion opening forward, the support member supported tiltably in the lamp body, and a plurality of reflectors supported side by side in one of the vertical and lateral directions by the support member, each reflector being made to support a corresponding light source, wherein at least one of the reflectors is pivotably supported by the support member in the horizontal direction.

In the vehicle headlamp according to the first aspect of the invention, as the reflectors are supported by one support member, which is tiltably supported by the lamp body, the reflectors are simultaneously tilted by the same amount in the same direction with respect to the lamp body by tilting the support member, so that aiming adjustment can simultaneously be made to the two reflectors. When the reflectors are supported by the support member in such a state that the relative angular relation between the optical axes of the reflectors has been set consistent with the relation between the beams emitted from the reflectors, moreover, the aiming adjustment may be carried out by tilting the support member. Therefore, it is unnecessary to adjust the angular relation between the optical axes of the two reflectors again.

According to a second aspect of the invention, as two of the reflectors are arranged side by side in the vertical direction and the lower reflector is pivotable in the horizontal direction, luminous distribution in the lateral direction can be added to the luminous distribution derived from the upper reflector as occasion demands.

According to a third aspect of the invention, as the upper reflector is disposed backward with respect to the lower reflector, a headlamp having the front tilted backward can be dealt with and simultaneously the drive portion for pivoting the lower reflector can be disposed backward with respect to the lower reflector.

According to a fourth aspect of the invention, as the low beam is formed by the upper reflector and a light source supported by the upper reflector, and as the upper reflector has not any portion which does not affect luminous distribution (that is, the lower portion not effecting luminous distribution has been removed), the two reflectors can be disposed in the vertical direction without waste of space thereby reducing the vertical size of the headlamp.

According to a fifth aspect of the invention, the drive portion having the rotating shaft is disposed under the lower reflector and the rotating shaft of the drive portion is connected to the undersurface of the lower reflector and the lower reflector is pivoted in the horizontal direction by rotating the rotating shaft of the drive portion, whereby the space between the two reflectors is reducible without holding any additional member therebetween.

According to a sixth aspect of the invention, a lamp shade is used which opposes the corresponding light source for the upper reflector and is operable to ensure that light emitted from the light source is only emitted to the upper reflector.

Therefore, in addition to its use in low beam operations, the lamp shade allows for the portion under the light-source mounting position to be removed from the reflector positioned on the upper side, so that the lower reflector can be disposed in the portion thus removed, whereby the size of the vehicle headlamp in the vertical direction is reducible.

What is claimed is:

1. A vehicle headlamp comprising:
    a lamp body including a hollow portion opening forward;
    a support member tiltably supported in the lamp body; and
    a plurality of reflectors supported side by side in one of the vertical and lateral directions by the support member, each reflector being made to support a corresponding light source, wherein:
    at least one of the reflectors is pivotably supported by the support member in the horizontal direction;
    two reflectors are supported side by side in the vertical direction by the support member; and
    at least the lower reflector of the two reflectors is pivotable in the horizontal direction,
    said vehicle headlamp further including a drive portion including a rotating shaft disposed under the lower reflector,
    wherein the rotating shaft is connected to an undersurface of the lower reflector, and wherein the lower reflector is pivoted in the horizontal direction by rotating the rotating shaft of the drive portion.

2. The vehicle headlamp according to claim 1, wherein the rotating shaft is operable to rotate in response to a steering operation of a vehicle.

3. The vehicle headlamp according to claim 1, wherein the upper reflector of the two reflectors is disposed rearward with respect to a position of the lower reflector.

4. The vehicle headlamp according to claim 1, wherein a low beam is formed by the upper reflector and the corresponding light source supported by the upper reflector, and wherein the entire upper reflector is operable to affect luminous distribution.

5. The vehicle headlamp according to claim 1, wherein a low beam is formed by the upper reflector and the corresponding light source supported by the upper reflector, and wherein the upper reflector has not any portion which does not affect luminous distribution.

6. The vehicle headlamp according to claim 1, wherein a low beam is formed by the upper reflector and the corresponding light source supported by the upper reflector, and wherein the upper reflector does not have any portion under a position where the corresponding light source is mounted.

7. The vehicle headlamp according to claim 1, further including a lamp shade opposing the corresponding light source supported by the upper reflector, the lamp shade operable to ensure that light emitted from the light source is only emitted to the upper reflector.

8. The vehicle headlamp according to claim 1, further including a front cover having lens steps operable to affect a luminous distribution pattern of the light sources.

9. A vehicle headlamp comprising:
a lamp body including a hollow portion opening forward;
a support member tiltably supported in the lamp body; and
a plurality of reflectors supported side by side in one of the vertical and lateral directions by the support member, each reflector being made to support a corresponding light source,
wherein at least one of the reflectors is pivotably supported by the support member in the horizontal direction, and
the support member includes upper and lower support arms respectively fixed to a substantially central portion and a lower end portion of the support member, the upper and lower support arms pivotably supporting the at least one of the reflectors.

10. The vehicle headlamp according to claim 9, including two reflectors supported side by side in the vertical direction by the support member, wherein at least the lower reflector of the two reflectors is pivotable in the horizontal direction.

11. The vehicle headlamp according to claim 10, wherein a low beam is formed by the upper reflector and the corresponding light source supported by the upper reflector, and wherein the entire upper reflector is operable to affect luminous distribution.

12. The vehicle headlamp according to claim 10, wherein a low beam is formed by the upper reflector and the corresponding light source supported by the upper reflector, and wherein the upper reflector has not any portion which does not affect luminous distribution.

13. The vehicle headlamp according to claim 10, wherein a low beam is formed by the upper reflector and the corresponding light source supported by the upper reflector, and wherein the upper reflector does not have any portion under a position where the corresponding light source is mounted.

14. The vehicle headlamp according to claim 10, further including a lamp shade opposing the corresponding light source supported by the upper reflector, the lamp shade operable to ensure that light emitted from the light source is only emitted to the upper reflector.

15. The vehicle headlamp according to claim 9, including two reflectors supported side by side in the vertical direction by the support member, wherein the upper reflector of the two reflectors is disposed rearward with respect to a position of the lower reflector.

16. The vehicle headlamp according to claim 9, further including a drive portion connected to the support member, the drive portion including a rotary disk and a drive link attached at a first end to the rotary disk, and at a second end to the upper support arm, wherein the drive portion is operable to rotate the rotary disk in response to a steering operation of a vehicle, which thereby moves the drive link, which in turn moves the upper support arm to pivot the at least one of the reflectors.

17. The vehicle headlamp according to claim 9, further including a front cover having lens steps operable to affect a luminous distribution pattern of the light sources.

* * * * *